United States Patent [19]

Marco et al.

[11] 4,341,669

[45] Jul. 27, 1982

[54] CELLULOSE DERIVATIVE/POLYETHER POLYAMINE/POLYEPOXIDE REACTION PRODUCT AS ANTISTATIC SOIL RELEASE FINISH FOR POLYESTER

[75] Inventors: Francis W. Marco, Pauline; Clarence O. Stokes, Jr., Spartanburg, both of S.C.

[73] Assignee: Milliken Research Corporation, Spartanburg, S.C.

[21] Appl. No.: 947,751

[22] Filed: Oct. 2, 1978

[51] Int. Cl.³ .......................... C08L 1/32; B05D 3/02; B32B 27/34; B32B 27/36
[52] U.S. Cl. .................................. 523/205; 427/386; 427/389.9; 427/393.1; 427/393.4; 428/395; 8/529; 8/115.6; 523/420; 524/911; 527/312
[58] Field of Search ........................................... 260/13

[56] References Cited

U.S. PATENT DOCUMENTS

| | | | |
|---|---|---|---|
| 2,744,035 | 5/1956 | Fierstein | 427/386 |
| 2,886,472 | 5/1959 | Condo | 260/13 |
| 3,380,850 | 4/1968 | Jones et al. | 427/390 B |
| 3,441,435 | 4/1969 | Kirschner | 427/390 B |
| 3,503,795 | 3/1970 | Chao | 427/390 B |

FOREIGN PATENT DOCUMENTS

| | | | |
|---|---|---|---|
| 684724 | 4/1964 | Canada | 427/386 |
| 882889 | 11/1961 | United Kingdom | 260/13 |
| 1011637 | 12/1965 | United Kingdom | 427/390 B |

*Primary Examiner*—John Kight, III
*Assistant Examiner*—Nathan M. Nutter
*Attorney, Agent, or Firm*—H. William Petry; Terry T. Moyer

[57] ABSTRACT

A polyester textile product having durable antistatic and soil release properties, said product being impregnated with the reaction product of; a cellulose ether or ester, a polyamine and a polyepoxide.

7 Claims, No Drawings

CELLULOSE DERIVATIVE/POLYETHER POLYAMINE/POLYEPOXIDE REACTION PRODUCT AS ANTISTATIC SOIL RELEASE FINISH FOR POLYESTER

Polyester has two supreme virtues which make it very desirable for use in clothing: it is cheap and it is durable. However, it also has a host of drawbacks which have prevented its complete acceptance. Lifetimes of effort have been spent in attempts to formulate finishes which will overcome these drawbacks, but there is currently no panacea and the various finishes currently used generally alleviate some shortcomings at the expense of others. One of the problems associated with polyester has been its tendency to retain electrostatic charges often causing it to cling to the wearer in an unflattering way, showing bulges which the wearer would prefer to hide in the drape of the garment. For less frivolous reasons, antistatic properties are extremely important for nurses' uniforms, operating room garments and any other textiles which will be used in potentially explosive atmospheres. Another serious deficiency of polyester is that it tends to retain oil and thus becomes permanently soiled. Various finishes will overcome either of these problems but previously no finish has been commercially suitable for simultaneously imparting durable soil release and antistatic properties to polyester. In most cases, the antistatic properties could be sacrificed for soil release properties, certainly, no housewife would have it otherwise; but in special garments where antistatic properties were essential, soil release had to be compromised. Since these garments are often white, substandard soil release properties are a major deficiency. A method has now been found for imparting durable soil release and antistatic properties to polyester. This is achieved by treating the polyester with a cellulose derivative then applying a polyamine and curing the polyamine and the cellulose derivative with an epoxide.

Suitable cellulose derivatives include cellulose ethers and esters having a degree of substitution of between about 0.5 and about 2.6. If the degree of substitution is less than about 0.5, it is difficult to fix the cellulose derivative to the polyester while if the degree of substitution is more than about 2.6, it is difficult to crosslink the cellulose derivative and the polyamine with the polyepoxide.

Suitable polyamines are represented by the structural formula:

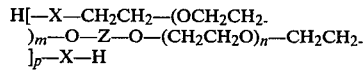

wherein —Z— is a divalent radical which is inert to reaction with amines, X is a member of the class consisting of

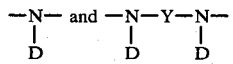

wherein —D— is a member of the class consisting of hydrogen, lower alkyl and amino lower alkyl and —Y— is a divalent aliphatic which contains only carbon and hydrogen, m and n are from about 3 to about 40 and p is less than about 10.

The durable soil release and antistatic properties are imparted to the polyester by first fixing the cellulose derivative to the polyester and then applying the polyamine and curing it with an epoxide.

DETAILED DESCRIPTION OF THE INVENTION

Suitable cellulose derivatives are represented by the formula

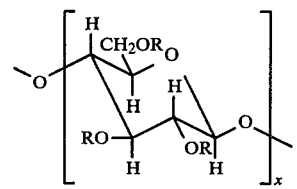

wherein each R is chosen from the group consisting of —H, —$C_nH_{2n+1}$, and

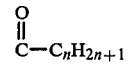

and n is from about 1 to about 4, x is at least about 50 and wherein on an average basis from about 0.5 to about 2.6 of the R groups on each repeating unit are other than hydrogen.

In the preferred cellulose derivatives each R is chosen from the group consisting of —H,

and —$C_nH_{2n+1}$ wherein n is from about 0.9 to about 2.3. The most preferred cellulose derivative is a cellulose acetate having an acetyl content of between about 24 and 36% wherein x is from about 100 to about 200.

The amount of the cellulose derivative applied to the polyester should be at least about 0.01% of the weight of the polyester. Preferably, the amount applied will be from about 0.05 to 0.4% of the weight of the fabric and the best results are obtained when the amount is from about 0.1 to about 0.2% of the weight of the fabric.

The cellulose derivative may be applied from a liquid dispersion by any suitable contacting method such as padding, exhaustion, spraying or similar methods. Especially desirable results can be obtained when the cellulose derivative is exhausted onto the polyester from a liquid dispersion. Whichever method is used, the dispersion will typically contain from about 0.001 to about 0.5% by weight of the cellulose derivative so that the amount of cellulose derivative applied will be at least about 0.01% of the weight of the polyester. After the cellulose derivative is applied to the polyester, it should be fixed. The method chosen for fixing depends upon the method chosen for application. These methods are well known but basically if the dispersion is sprayed or padded onto the polyester, the cellulose derivative is fixed by evaporating the liquid. Any suitable drying technique may be employed but care should be exercised to insure that neither the polyester nor the finish is degraded by excessively high temperature. If exhaustion is employed, the cellulose derivative is, of course, fixed during the exhaustion process. Exhaustion is an especially desirable method of applying and fixing the cellulose derivative since the fabric can be simultaneously dyed and further since intermediate drying can be avoided between fixing of the cellulose derivative and crosslinking the polyamine with the polyepoxide.

After the cellulose derivative has been fixed to the polyester, the polyamine and the epoxide are applied to the fabric. Suitable polyamines are described in detail in U.S. Pat. Nos. 3,021,232 and 2,982,751. Basically, these polyamines are represented by the structural formula

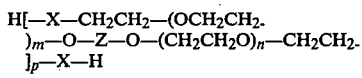

wherein —Z— is a divalent radical, X is a member of the class consisting of

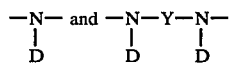

wherein —D— is a member of the class consisting of hydrogen, lower alkyl and amino lower alkyl and —Y— is a divalent aliphatic which contains only carbon and hydrogen, m and n are from about 3 to about 40, p is less than about 10. Since the character of Z is not critical, provided it is inert to reaction with amines, it may be any member of the class consisting of

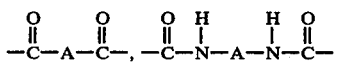

and —A—, wherein —A— is a member of the class consisting of divalent aliphatic, alicyclic, aromatic and heterocyclic radicals. Preferably —A— is a hydrocarbon moiety.

The preferred polyamines are represented by the structural formula:

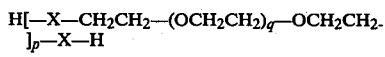

wherein X is a member of the class consisting of

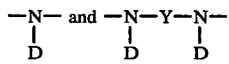

wherein —D— is a member of the class consisting of hydrogen, lower alkyl and amino lower alkyl and —Y— is a divalent aliphatic which contains only carbon and hydrogen, q is from about 6 to about 40 and p is less than about 10.

While any polyepoxide which is capable of crosslinking the polyamine and the cellulose derivative may be used, the preferred polyepoxides have the structural formula

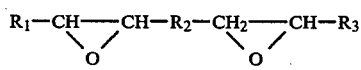

wherein $R_1$, $R_2$ and $R_3$ are chosen from the class consisting of aliphatic, alicyclic, aromatic, heteroaromatic, ester and ether groups.

Still more preferred are the polyepoxides represented by the structural formula

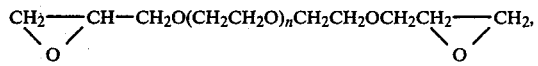

wherein n is from about 1 to about 15.

The polyamine and the polyepoxide may be applied simultaneously or in either order so long as both are present on the fabric for curing. If the polyamine and polyepoxide are applied simultaneously from an admixture it is sometimes advantageous for that admixture to be slightly acidic to retard premature reaction but this is not always necessary if the holding time is sufficiently short.

The polyamine and the polyepoxide may be applied by any method which applies a sufficient amount to the fabric. Suitable methods include padding, spraying, dipping and immersion. After the polyamine and polyepoxide contact the polyester, the pH is not critical, it may be acid, basic or neutral and crosslinking will occur. Typically, the polyether polyamine will be at least 0.05% of the weight of the polyester. Preferably, the amount of polyether polyamine applied will be between about 0.2 and 10% of the weight of the polyester and more preferably between about 1 and 5%. The amount of epoxide applied should be sufficient to crosslink the polyamine and the cellulose derivatives. Typically, the amount of epoxide will be at least about 1% of the weight of the polyamine while in preferred embodiment, the amount of the epoxide applied should be between about 5 and about 20% of the weight of the polyamine and more preferably between about 8 and 12%.

After the polyamine and epoxide have been applied, crosslinking is accomplished by drying and curing at an elevated temperature.

Typically, curing will take place at temperatures of at least about 100° C. The temperature chosen should not be so high as to degrade either the polyester or the finish. Conveniently, a catalyst such as zinc fluoroborate may be included to accelerate curing or crosslinking.

The following example is provided to more fully illustrate the invention which is defined solely by the claims:

EXAMPLE

Cellulose acetate having an acetyl content of 32% was exhausted onto polyester fabric from an aqueous dispersion at 130° C. in an amount equal to 0.3% of the weight of the fabric.

An aqueous formulation was prepared having the following composition:

7.5% Aston 123 (a highly ethoxylated polyamine) manufactured by Refined Onyx 0.75% Accelerator DT (an ethoxylated epoxide) manufactured by Refined Onyx 0.38% Zinc Fluoroborate This aqueous formulation was padded onto treated polyester fabric and an untreated control fabric at a pickup of about 100% of the weight of the fabric. Both fabrics were then dried and cured at 350° F. for 5 minutes. The resistivity of both samples was measured after curing and again after 1, 5 and 10 washes in a standard home washing machine using 100 grams of AATCC detergent at 120° F.

| | Electrical Resistivity in Ohms per Square as Measured to AATCC Test Method 76 - 1975 at 70° F.; 65% Relative Humidity | |
|---|---|---|
| | Treated Sample | Untreated Control |
| Initial | $3.0 \times 10^9$ | $1.4 \times 10^{10}$ |
| 1 Wash | $5.6 \times 10^9$ | $2.1 \times 10^{12}$ |
| 5 Washes | $2.7 \times 10^{11}$ | $5.6 \times 10^{13}$ |
| 10 Washes | $2.0 \times 10^{10}$ | $5.7 \times 10^{14}$ |

As our invention, we claim:

1. A textile product including polyester fibers impregnated with the reaction product of
   a cellulose derivative chosen from the group consisting of: cellulose ethers and cellulose esters having a degree of substitution of between about 0.5 and about 2.6 and being present in an amount of at least about 0.01% of the weight of the polyester fibers;
   a polyether polyamine in an amount of at least about 0.05% by weight of the polyester fibers; and,
   a polyepoxide in an amount at least sufficient to cross link the polyether polyamine and the cellulose derivative.

2. The textile product of claim 1 wherein the repeating unit of said cellulose derivative may be represented by the structural formula:

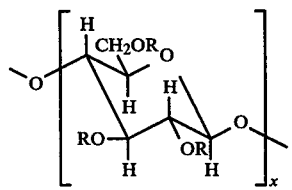

wherein each R is chosen from the group consisting of —H, $C_nH_{2n+1}$ and

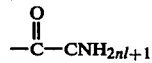

wherein n is from about 1 to about 4 and wherein on an average basis from about 0.5 to about 2.6 of the R groups on each repeating unit are other than hydrogen.

3. The textile product of claim 2 wherein said polyether polyamine has the structure formula:

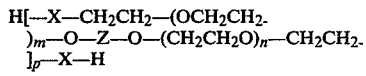

wherein —Z— is a divalent radical which is inert to reaction with amines, X is a member of the class consisting of

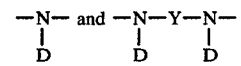

wherein —D— is a member of the class consisting of hydrogen, lower alkyl and amino lower alkyl and —Y— is a divalent aliphatic which contains only carbon and hydrogen, m and n are from about 3 to about 40 and p is less than about 10.

4. The textile product of claim 3 wherein the polyether polyamine is present in an amount between about 0.2 and about 10% of the weight of the polyester fibers.

5. The textile product of claim 4 wherein the polyepoxide is present in an amount of at least about 5 to about 20% of the weight of the polyether polyamine.

6. The textile product of claim 1 wherein said polyether polyamine has the structural formula:

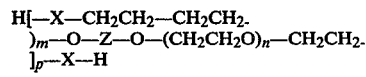

wherein —Z— is a divalent radical which is inert to reaction with amines, X is a member of the class consisting of

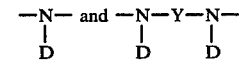

wherein —D— is a member of the class consisting of hydrogen, lower alkyl and amino lower alkyl and —Y— is a divalent aliphatic which contains only carbon and hydrogen, m and n are from about 3 to about 40 and p is less than about 10.

7. The textile product of claim 6 wherein the cellulose derivative is a cellulose acetate having an acetyl content of between about 24% and about 36%.

* * * * *